United States Patent [19]

Hinssen et al.

[11] Patent Number: 4,507,267
[45] Date of Patent: Mar. 26, 1985

[54] HEAT-AIDED METHOD FOR SEPARATING THE GRAPHITE MATRIX FROM THE NUCLEAR FUEL OF NUCLEAR REACTOR FUEL ELEMENTS

[75] Inventors: Hans-Klemens Hinssen, Nettetal; Werner Katscher, Jüich; Karl-Josef Loenissen, Jülich; Rainer Moormann, Jülich; Heinz Seeboth, Hückelhoven; Bernhard Stauch, Jülich; Josef Thelen, Titz, all of Fed. Rep. of Germany

[73] Assignee: Kernforschungsanlage Jülich Gesellschaft mit beschränkter Haftung, Jülich, Fed. Rep. of Germany

[21] Appl. No.: 447,518

[22] Filed: Dec. 7, 1982

[30] Foreign Application Priority Data

Dec. 16, 1981 [DE] Fed. Rep. of Germany ....... 3149795

[51] Int. Cl.$^3$ .................... G21C 19/42; C01G 56/00
[52] U.S. Cl. ........................ 423/4; 252/639; 264/0.5
[58] Field of Search ........ 423/4, 5; 422/903; 252/638, 639; 376/311, 411; 264/0.5

[56] References Cited

U.S. PATENT DOCUMENTS 3,453,090 7/1969 Schulter ................................ 423/4
4,134,941 1/1979 Hrovat ............................ 252/639 X
4,228,141 10/1980 Sugikawa .......................... 423/4 X

FOREIGN PATENT DOCUMENTS 1464647 1/1969 Fed. Rep. of Germany .

OTHER PUBLICATIONS

*Inorganic Chemistry*, E. Barnett, Longmans, Green and Co., London, 2nd Ed., 1957, p. 410.
*Nuclear Graphite*, R. Nightingale, Academic Press, NY and London, 1962, p. 450.
R. Bohnert and G. Kaiser–Apr. 14, 1972, pp. 252-255 of OAEF Reactor Conf. in Hamburg, Germany.

*Primary Examiner*—Deborah L. Kyle
*Assistant Examiner*—Virginia B. Caress
*Attorney, Agent, or Firm*—Frishauf, Holtz, Goodman & Woodward

[57] ABSTRACT

Removal of the graphite structure from the nuclear fuel material of fuel elements of gas-cooled high-temperature reactors is performed by heat-treatment of the fuel elements in oxygen-containing gas at temperatures below 700° C. until the carbon or graphite structure is loosened up and converted into a mechanically removable material. During heat-treatment, mechanical forces are preferably applied for continually removing the outer layers that are most heavily attacked and transport of the dust into cooler temperature zones. For this purpose, the fuel elements are agitated during heat-treatment, as by an oscillating sieve or by brushes. Pre-impregnation with a material catalyzing the combustion is useful if it is important to have the heat-treatment temperature as low as possible.

9 Claims, No Drawings

HEAT-AIDED METHOD FOR SEPARATING THE GRAPHITE MATRIX FROM THE NUCLEAR FUEL OF NUCLEAR REACTOR FUEL ELEMENTS

The invention concerns a method for separating the graphite matrix or structure from the nuclear fuel of the fuel elements of high-temperature gas-cooled reactors (HTRs) by treatment at elevated temperature in oxygen-containing gas.

In the reprocessing of fuel elements for gas-cooled HTRs, an important process step is the separation of the particles containing the nuclear fuel, generally known as "coated particles", from the surrounding graphite or from the graphite matrix of the fuel elements.

A typical spherical fuel element of a ball-pack HTR comprises a spherically shaped graphite shell having an outer diameter of 60 mm and a wall thickness of 5 mm, which encloses a graphite core in which are embedded the particles containing the nuclear fuel material. Each of the latter consist of a spherical fuel or breeder material kernel of heavy metal oxides or carbides enveloped in layers of pyrolytically deposited carbon or other ceramic materials, such as SiC. These layers serve to contain and prevent the escape of radioactive fission products set free in the fuel by the nuclear fission reactions.

Outside of the German Federal Republic, HTRs are being developed with fuel elements of other geometric shapes, but all of these have in common with the elements described above the use of "coated particles" which are embedded in graphite structures.

HTR fuel elements are described in various publications, including for example JÜL-Bericht 1159 of January 1975 (a report from the assignee of this application). The typical "coated particle" content by volume in a fuel element is around 10% of the entire fuel element volume.

For the separation of the nuclear fuel material from graphite which is necessary in the processing of used fuel elements, a process has received attention up to now (see annular report "JAHRESBERICHT" 1978/79 of KFA JÜlich, ISSN 0341-8790, p. 26), in which the fuel elements are first reduced mechanically in size by a grinding process—which leads to, among other things, destruction of the coatings of a large number of the particles—after which burning up of all the graphite is performed in a fluidized bed furnace at 850° C. The waste gas produced by the grinding and burning is cleaned to eliminate the volatile fission products and is then given off into the atmosphere.

In this cleaned waste gas, a content of radioactive $^{14}CO_2$ is present that originates mainly from the structure graphite. The $^{14}CO_2$ content is accorded growing significance today in the effort to minimize radiation exposure of the population resulting from the operation of nuclear-technology installations. It has already been proposed that carbon dioxide should be separated from the waste gas, for example by reaction with lime water to precipitate $CaCO_3$ as a low-activity deposit. That is a relatively expensive process on account of the large quantities of lime and of gas to be converted.

According to another known process, the cost of the mechanical reduction of the size of the elements or of their graphite shells is saved, and the process is simplified, by completely reducing the intact fuel elements to ashes by burning in flowing oxygen at a temperature from 600° to about 1600° C. (e.g. at 1200° C.), as described in DE-OS No. 1 464 647, or subjecting the fuel elements to a complete gasification of graphite into $CO_2$ gas after the addition of catalysts at above about 1000° C. or below 900° C. (e.g. at 850° C.) according to the choice of catalysts, as described in DE-OS No. 2 809 686. In these processes, a certain simplification is indeed obtained, but the waste gas problem remains.

For reducing the quantities of carbon that are to be gasified and later re-solidified, it has also been proposed to provide a preliminary step of removing the fuel-free shell of the fuel elements, an operation that involves relatively high expense, however, in view of the necessary through-put of great quantities of fuel elements in installations that must be remotely operated for reasons of protection against radiation. Other processes proposed in an earlier development stage of HTR fuel element reprocessing have not been found practical, for economic and technical reasons. Such other processes are, for example, the electrolytic disintegration or cracking of the graphite lattice by the formation of intercalates with cesium, bromine or ferric chloride.

SUMMARY OF THE INVENTION

It is an object of the present invention to provide a process by which the pollution of the environment with $^{14}CO_2$ is substantially reduced without requiring an extraordinary application of absorbents and supplementary precautions, procedures and installations.

Briefly, the fuel elements are heat-treated in oxygen-containing gas at temperatures below 650° C. until loosening up of the carbon or graphite structure produces a mechanically removable substance, and the loosened layers are separated by mechanical attack.

This process, by which the graphite is separated from the nuclear fuel, or, more particularly, from the "coated particles" by means of partial combustion and mechanical treatment (which can take place simultaneously or in alternation) is based on appreciation of the fact that during "burning" of graphite with oxygen-containing gases at temperatures below 650° C., a corrosive attack penetrating into the depth of the material takes place. That corrosive attack is more or less extensive according to temperature. In consequence, the coked or graphitized binder that produces the cohesion of the graphite granules ("filler granules") is preferably attacked. The fuel element graphite already loses its solidity (crush resistance) when about 5 to 25% of the graphite is burned. That amounts to relatively slight burning of the graphite. The graphite residue can be removed as a fine powder or dust.

The lower the heat treatment temperature is selected, the more uniformly the cohesion loss is distributed over the entire cross-section of the fuel element, but at the same time the rates of burn-off are also correspondingly smaller. Experimental corrosion of a fuel element sphere in air at a temperature of 350° C. resulted, for example, in a weight loss of 10% only after 200 days, and that loss was distributed uniformly over the entire volume. These low combustion rates, which are hardly acceptable for reprocessing, can be raised by increasing the temperature to an economically practical level, although with increasing temperature there appears a more steeply rising burn-off gradient from the surface of the graphite body to its interior.

If it is desired to disintegrate the graphite body with a rather slight amount of burn-off, care must be taken to remove the loosened outer layers as continuously as possible and to cool down the graphite dust contained in the removed products to such an extent that its combustion reaction will come to a stop. Treatment temperatures up to 650° C., especially those from 500° to 600° C. are preferred.

In experiments in which unirradiated fuel element spheres were corrosively attacked by air at 560° C., in which the spheres were taken out of the calcining furnace after 24 hours and thereafter every 15 hours to have the graphite dust brushed off before return to the furnace, a complete disintegration was obtained after a total of 54 hours. The total burn-off of carbon here amounted to 19%.

The burn-off can be further reduced by continuous separation of the graphite dust by persistent revolving of the fuel elements in a rotary furnace, their agitation on a shake-sieve in the reaction furnace and/or by brushing, during which the graphite dust and the particles fall through a grating or screen into a chamber cooled to temperatures below 200° C.

Since the combustion rate of fuel element graphite per unit of the geometric surface is substantially higher than that of the pyrocarbon of the coated particles, the particles are not damaged by the above-described disintegration process. That applies to a particularly complete extent for particles having an intermediate layer of SiC in the coating. The particles can then be separated from graphite dust without liberating their fission product content by well-known methods, for example in a cyclone separator, and thereafter made available for further processing steps of known types.

The weakly radioactive graphite dust itself can then be put into a storable form, for example after a process such as is used in the manufacture of fuel elements, e.g., by mixing with a pitch resin or phenol resin binder, pressing and coking. The graphite dust can also be recycled ultimately by using it in the refabrication of fuel elements.

By the process set forth above, it is thus possible to reduce the evolution of combustion gases by about 80% and thereby to reduce also the relative amount of C-14 set free in comparison to the previously developed fluidized bed combustion process. Because of the low combustion temperatures, the requirements imposed on the construction materials for the preferably electrically heated reaction chamber are of small consequence, and the gas through-put (necessary for maintaining sufficient $O_2$ partial pressures for the partial combustion of the graphite) is so low on account of the relatively low combustion rate, that dust transport problems can be extensively reduced.

If, for example, a further reduction of the combustion temperature should be desired because of the furnace materials, without letting the combustion rate sink to an uneconomic level, that can be done by impregnating the graphite as homogeneously as possible with a suitable catalyst. For this purpose, deposit of the catalyst out of aqueous solution is particularly advantageous. For example, fuel element spheres were boiled in a water solution that contained 2.5% by weight of $CsNO_3$ for three hours in a vessel that could be sealed. During the boiling, a part of the gas was driven out of the porous structure of the spheres, and the water solution was degassed. Then the vessel was sealed and cooled down to room temperature, producing a pressure drop in the vessel corresponding to the vapor pressure which led to a further liberation of gas out of the porous structure of the sphere. After a pause of several hours, the vessel was opened to the atmosphere again, while the spheres remained completely immersed in the solution. After about 12 hours, each sphere was removed and weighed. A weight increase of about 5% was registered. After a drying step, it could be determined that the cesium nitrate was distributed practically uniformly over the cross-section of the sphere, with the cesium content in the graphite amounting to about 0.1% by weight.

By way of modification, the impregnation with catalysts can also be obtained by dry evacuation followed by contact under pressure with catalyst-containing liquid.

The doped spheres were then corroded in air at 350° C. with practically the same effect being obtained as in the above-described case of partial combustion, without catalyst doping, at 560° C.

Catalysts that promote oxidation of graphite are suitable for the corrosion of fuel element spheres. Such "catalysts" are more properly referred to as reaction-promoting materials since they do not all come out unchanged after the reaction. It has been found by experiment that alkali metal nitrates and their analogs, such as e.g. thallium nitrate, or alkali metal iodides, particularly cesium iodide, are usable in the above-described low-temperature heat treatment of fuel element spheres. The catalyst content proportions generally lie between 0.01% and 1% by weight. The disintegration temperatures for the case of catalyst-containing fuel elements are mainly around 300° to 400° C.

The method of the invention is particularly well-suited for disintegration of spherical fuel elements, but it is not limited to these and is also basically applicable to prismatic fuel elements, so far as their structure graphites show similar dependencies of the loss of cohesion as a function of chemical burn-off.

A furnace for treatment of fuel elements according to the invention for partial combustion of the graphite structure with simultaneous mechanical stressing of the fuel elements located in the furnace is provided in the usual way with safeguards and equipment for the processing of radioactive material in which radioactive waste gases are developed, and also with a temperature control system designed for process temperatures up to at most 650° C., and with means for exerting a grinding or friction effect on the elements located in the furnace. Such means can, for example, be constituted by moving brushes or oscillating sieves. A grinding effect wearing off the surface layers can also be produced by revolving the furnace charge in a rotary oven.

Although the invention has been described with reference to particular illustrative examples, it will be understood that modifications and variations are possible within the inventive concept.

The graphite referred to as the material of the encasing structures of the fuel elements in which the coated fuel particles are embedded and which forms the outer shell may be a natural graphite material or an artificial graphite material, and is commonly, as mentioned above, consolidated by means of an organic binder which is coked in manufacture of the fuel elements.

Depending on the special type of graphite it may be advantageous to accelerate the process by treating the elements in a furnace heated even up to about 700° C. while controlling the oxygen pressure and limit the burn-off of the graphite to not more than 25% and simultaneously subjecting the elements to an abrasive action which permanently removes the loosened outer layers.

We claim:

1. Method for separation and removal of the encasing graphite from the nuclear fuel of gas-cooled high-temperature reactors by treatment with oxygen-containing gas at elevated temperature, comprising the steps of:

maintaining said fuel elements in a furnace at a temperature between 200° C. and 700° C. in an atmosphere of oxygen-containing gas for a period sufficient to produce the loosening up of the carbon or graphite structure thereof without burning more than 25% of the carbon so as to form a mechanically separable substance, and separating the loosened layers of said carbon or graphite structure by mechanical attack.

2. Method according to claim 1, in which during the heat treatment of said fuel elements in oxygen-containing gas, said fuel elements are subjected to mechanical abrasion or shear forces, and the dust thereby formed is transported into cooler temperature zones where temperatures are more than 100° C. below the furnace temperature.

3. Method according to claim 2, in which said fuel elements, during their treatment at temperatures between 200° C. and 700° C. are rolled about in a rotary furnace.

4. Method according to claim 2, in which said fuel elements while being maintained at temperatures between 200° C. and 700° C., are moved about on an oscillating sieve.

5. Method according to claim 2, in which said fuel elements, during the time they are maintained at temperatures between 200° C. and 700° C., are continually freed, by moving brushes, of layers loosened up by slow combustion that takes place in the presence of said oxygen-containing gas at said temperatures.

6. Method according to claim 1, in which said step of maintaining said elements at a temperature between 200° C. and 700° C. in a furnace is carried out at a temperature between 200° C. and 500° C., and prior thereto the step is performed of impregnating said carbon or graphite structure with a substance capable of promoting a combustion reaction in said gas.

7. Method according to claim 6, in which said reaction-promoting substance is deposited out of a solution.

8. Method according to claim 7, in which the solution from which said reaction-promoting substance is deposited is an aqueous solution.

9. Method according to claim 8, in which said reaction-promoting substance is an alkali metal nitrate.

* * * * *